United States Patent Office 3,508,799
Patented Apr. 28, 1970

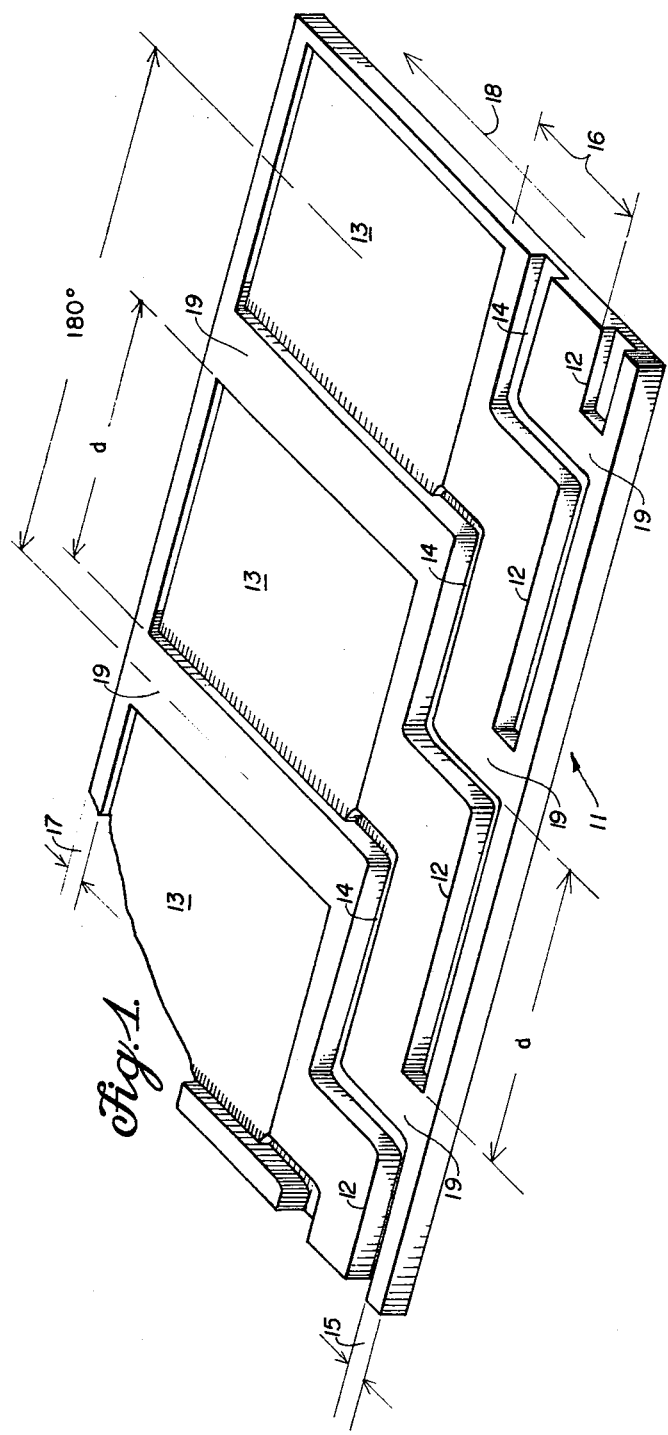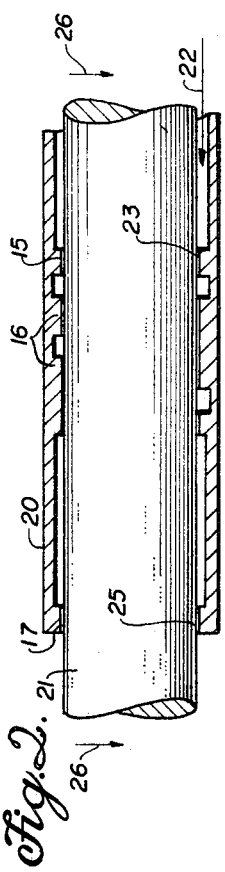
INVENTOR.
CARROLL M. GORDON

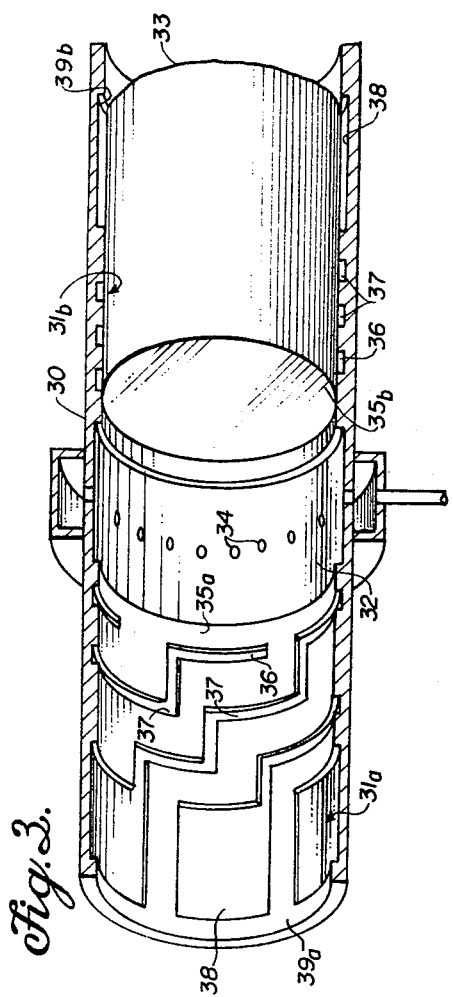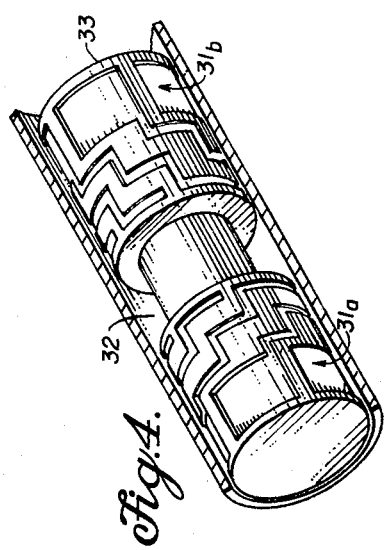

3,508,799
GAS BEARINGS
Carroll M. Gordon, Danville, Calif., assignor to the United States of America as represented by the United States Atomic Energy Commission
Filed July 22, 1968, Ser. No. 746,576
Int. Cl. F16c 1/24
U.S. Cl. 308—122                4 Claims

ABSTRACT OF THE DISCLOSURE

An externally pressurized, gas-lubricated journal bearing having bushing or bearing surface recessed to define a plurality of relatively large shallow pressure pockets and relatively narrow inlet orifice pockets equally spaced about the circumference adjacent to the gas outlet and inlet sides of the bearing, respectively. Each pressure pocket is connected by a channel to a diametrically opposite narrow orifice pocket to implement inherent servo control for centering and strengthening lateral stiffness of the moving member of the bearing.

BACKGROUND OF THE INVENTION

The invention evolved in the course of, or under, Contract No. W-7405-ENG-48 with the United States Atomic Energy Commission.

Externally pressurized gas journal bearings and the concept of utilizing a pressurized gas for a lubricant are well known. Their primary advantages are an extremely low viscosity of gaseous lubricants and low coefficients of friction. However, conventional gas journal bearings have usually had limited utility because of their low load-carrying ability and low radial stiffness. In particular, the moving member within the bearing tends to yield when loaded externally, which may, under dynamic circumstances, generate destructive oscillations and vibrations.

Generally, the load-carrying and radial stiffness properties of externally pressurized gas journal bearings are pressure-dependent. However, increasing the pressure in such bearings inherently leads to higher gas consumption which essentially makes the bearings functionally impractical except in instances where either high gas consumption or low radial stiffness can be tolerated.

Various prior attempts to reduce the gas consumption, while simultaneously increasing the load capacity and radial stiffness of externally pressurized gas journal bearings, have involved a reduction of the radial clearance gap between the journal and bearing surfaces. However, gas consumption increases with the cube of the mean radial clearance; hence, gas consumption cannot be significantly reduced because of the difficulty in obtaining the necessary manufacturing tolerances.

Other previous practices for increasing radial stiffness and load-carrying ability of such bearing are concerned with externally controlling gas flow through individual orifices arranged in circumferential rows around the journal or bearing surface. Specifically, gas flow into a particular circumferential section of the bearing can be increased or decreased to compensate for applied loads on the bearings. However, these practices are unsatisfactory because of increased dynamic instabilities under loaded conditions, a high degree of complexity, and high gas consumption.

In addition, prior externally pressurized gas-lubricated journal bearings are sensitive to minute pressure fluctuations of the gas supply. These gas pressure instabilities which are inherent in most gas supply systems are transmitted to the bearing, causing vibration and increased dynamic instability. Consequently, such gas bearings require a complicated gas supply system which will eliminate these gas pressure instabilities.

It will therefore be appreciated that extrenally pressurized, gas-lubricated bearings would have ideal operational characteristics for the machining arts and elsewhere if the radial stiffness and the load-carrying ability factors could be increased without incurring penalties of high gas consumption and increased dynamic instability.

SUMMARY OF THE INVENTION

The present invention relates to an externally pressurized gas journal bearing in which a unique contour indented into either the journal surface or the bearing surface in the bearing inherently provides a servo mechanism controlling gas flowing into and out of circumferential sections of the bearing in such a manner as to strengthen the self-centering characteristic of the bearing, and thereby provide an increased radial stiffness, an increased load-carrying ability and an enhanced dynamic stability, without increasing the gas consumption of the bearing. Specifically, the contoured surface of the bearing provides a plurality of deep circumferential orifice pockets, each connected by a channel indentation to a diametrically opposed, large surface area, shallow pressure pocket. The raised portions of the contour between pocket indentations function as gas flow restrictors (restrictive lands) which control and direct gas flow in the bearing. The annular raised sections of the contour at either end of the journal and/or bearing surface coact with the smooth surface of the corresponding bearing and/or journal surface to define an annular inlet and an annular outlet orifice which control gas flow into and out of the bearings.

Briefly, a pressurized lubricating gas flows through the annular inlet orifice and is directed by the restrictive lands into the deep circumferential orifice pockets, whereupon it flows through the respective channel indentations to the diametrically opposed, large surface area, shallow pressure pocket. The lubricating gas then flows from the pressure pockets through the annular outlet orifice. The servo mechanism strengthening the self-centering characteristics of the bearing is inherently provided by coaction of the annular inlet and outlet orifices and the contoured journal or bearing surface, where the gas flowing into and out of circumferential sections of the bearing is governed by the width of the orifices in that circumferential section. Specifically, assuming a small radial displacement of the loaded member of the bearing, gas flow into the bearing increases in the widened annular section of the annular inlet orifice, increasing gas pressure in the diametrically opposite pressure pockets. Also, gas flow into the bearing decreases in the diametrically opposed narrowed annular section of the inlet orifice to decrease pressure in the pressure pockets diametrically opposed therefrom. The annular outlet orifice supplements the above pressure effects in that gas flow from the pressure pockets increases in the widened annular section of the orifice, and decreases in the diametrically opposite narrowed section. The different pressures in the pressure pockets re-center the loaded member of the bearing. The annular inlet and outlet orifices also limit gas consumption of the bearing. In addition, small pressure instabilities of a gas supply system are not transmitted to the bearing because of the servo action provided by the contour surface of the bearing.

DESCRIPTION OF THE DRAWINGS

FIGURE 1 is a planar, unfolded perspective presentation of a journal or bearing contour in accordance with the invention;

FIGURE 2 is a diametric sectional view of the contour indented into the journal surface in relation to the bearing surface of the shaft;

FIGURE 3 is a sectional cutaway view of a two-bearing system in which the invented contour is again indented into the journal surface; and FIGURE 4 is a sectional view of a two-bearing system in which the invented contour is indented into the bearing surface on the journal shaft.

DESCRIPTION OF THE PREFERRED EMBODIMENTS

The basic structural embodiments of the invention are illustrated in FIGURE 1. The contour shown indented into the representative journal or bearing surface 11 defines circumferentially extending orifice pockets 12, each connected to a diametrically opposite shallow pressure pocket 13 of much larger surface area by a channel indentation 14 which is a continuation of the respective orifice pocket 12. In an exemplary embodiment, the depths of the orifice pockets 12 and the corresponding channel indentations 14 equals the axial width of the orifice pockets 12. The depths of the pressure pockets 13 in the above embodiment are comparable to the radial clearance between cooperating journal and bearing surfaces. The circumferential widths of the orifice pockets 12 and the pressure pockets 13 are equal. The representative surface 11 is oriented in a gas stream indicated by arrow 18 such that the orifice pockets 12 precede the pressure pockets 13 in the gas stream. The annular section 15 of the contour between the orifice pockets 12 and the leading peripheral edge of the surface 11, with respect to the direction of gas flow, functions as an inlet control. The annular section 16 between the orifice pockets 12 and the pressure pockets 13 traversed by the channel indentations functions as a flow restrictor. The annular section 17 between the pressure pocket 13 and the outer peripheral edge of the surface 11 functions as an outlet control. The axial length of section 16 is much greater than the axial lengths of annular sections 15 and 17. To increase the clarity of the following description, these annular contour sections 15, 16 and 17 shall be referred to hereinafter as annular lands 15, 16 and 17, respectively.

The sections 19 of the contour separating the orifice and pressure pockets 12 and 13, parallel to the longitudinal axis, prevent gas from flowing circumferentially between pockets except as permitted by the channel indentations 14.

Referring now to FIGURE 2, the described contour is indented into the inside surface of a cylindrical journal housing 20. A smooth cylindrical shaft 21 fits closely within the journal housing 20 such that the radial clearances between the shaft 21 and the annular lands 15, 16 and 17 of the contour are very small. (For purposes of illustration, these radial clearances have been greatly exaggerated.) The pressurized gas lubricant flows from right to left, as indicated by arrow 22.

An annular inlet orifice 23, defined by the smooth shaft surface and the annular land 15 of the contour, controls the amount of gas flowing into the circumferential sections of the bearing, directing gas flow according to sectional circumferential clearances between the annular land 15 and the shaft surface 24. The annular land 16 of the contour greatly impedes axial gas flow because of its relative width with respect to the annular land 15, whereupon gas flow is directed into the orifice pockets 12, through the channel indentations 14, and into the pressure pockets 13. An annular outlet orifice 25 defined by the shaft surface and the annular land 17 controls the gas flowing out of the gas pressure pockets 13, again directing gas flow according to the respective sectional circumferential clearances between the annular land 17 and the shaft surface 24.

The inherent mechanism, by means of which the contour surface shown in FIGURES 1 and 2 imparts radial stiffness, load-carrying ability, and dynamic stability to the bearing, can be described as follows: For any of the large pressure pockets 13, the gas intake of that pocket is the orifice pocket 12 diametrically opposite therefrom communicating therewith via a channel indentation 14. Accordingly, whenever the shaft 21 is radially displaced, the pressure pockets 13 which are on the side where the clearance is enlarged will lose gas at a more rapid rate because the circumferential section of the annular outlet orifice 25 for these pockets 13 is enlarged. However, the pressure pockets 13 on the side where the clearance is decreased will lose gas at a less rapid rate because the circumferential section of the annular outlet orifice 25 for those pockets is narrowed. Simultaneously, gas flow into the bearing contour will increase on the side of enhanced clearance, and decrease on the side of decreased clearance. The gas flow through the annular inlet orifice 23 is channeled by the annular land 16 (flow restrictor) into the orifice pockets 12, through the respective channel indentations 14, and into the gas pressure pocket 13 on the diametrically opposite side. Accordingly, in pressure pockets 13 on the side of enlarged clearance, the inlet flow decreases and the outlet flow increases, causing a pressure drop therein. In pressure pockets 13 on the side of decreased clearance, the inlet flow increases and the outlet flow decreases, causing a pressure increase therein.

As circumferential and pumping gas flow is prevented by the axial sections 19 of the contour separating the orifice and pressure pockets, the pressure differential thus created on the diametrically opposite circumferential sections of the bearing forces the shaft 21 to return to the centered equilibrium position.

In particular, the contour inherently provides a servo mechanism for centering the shaft 21 in the journal housing 20. The servo action is provided by the annular inlet orifice 23 controlling gas flow into the circumferential row of uniformly spaced orifice pockets 12, by the annular flow restrictive land 16 directing gas flow into the channel indentations 14, and by the outlet orifice 25 controlling gas flow out of the circumferentially spaced gas pressure pockets 13. Feedback in the mechanism is inherently provided by the compensative movement of the shaft 21 readjusting the circumferential radial clearances between the shaft bearing surface 24 and the annular lands 15, 16 and 17 of the contour. Over-compensation, under-compensation and servo action oscillations are minimized by adjusting the inlet pressure to the particular radial load applied to the bearing as indicated by an arrow 26. Also, the equalized circumferential width of the orifice pockets 12 and the pressure pockets 13 serve to minimize hydrostatic servo action oscillations. Other critical natural and resonant oscillations of the described gas bearing can be avoided by standard practices well known in the gas bearing art.

The response time of the inherent servo mechanism is primarily dependent on the volume of the gas pressure pockets 13. Consequently, the depth of the gas pressure pockets 13 is minimized, also decreasing the flow resistance of the channel indentations 14, shortens the time response of the inherent servo mechanism. Other factors affecting the time response of the inherent servo mechanism relate to the differential gas pressures in opposing pressure pockets 13. More particularly, the time response is also dependent on the rate of increasing and decreasing pressures in the gas pockets 13, which in turn is dependent on the following: the widths of the annular sections 15 and 17 of the described contour, the mean radial clearance gap between the annular sections 15 and 17 and the shaft bearing surface 23, and the gas pressure drop through the gas bearing.

However, these contour parameters also affect the gas consumption, the radial stiffness and the load-carrying properties of the bearing. Specifically, these parameters are optimized in relation to the following factors: a desired time response, a prescribed radial stiffness, gas consumption limits, and the needed load-carrying capacity. In general, the inherent servo mechanism provided by optimizing the described bearing contour stiffens the bearing, enabling it to carry an increased radial load without significantly increasing gas consumption. Also, the equal circumferential widths of the orificial pockets 12 and the pressure pockets 13 implement hydrostatic property to the descibed contour which damps dynamic vibrations of the loaded member of the bearing.

FIGURE 3 illustrates an embodiment of the described externally pressurized gas journal bearing in which the described surface contour 11 is indented into two spaced journal seat surfaces. Pairing the described contour surface in the same journal housing further enhances the radial stiffness and the load-carrying capacity of the bearing. Pressurized gas is introduced into an annular gas plenum 32 defined between the journal seat, contoured surfaces 31a and 31b, and the smooth shaft 33, through a circumferential row of orifices 34 communicating through the journal housing 30. The pressurized gas flows through the annular inlet orifices 35a and 35b, into the orifice pockets 36, through the circumferential channel indentations 37, into the gas pressure pockets 38, and out of the annular outlet orifices 39a and 39b. The inherent servo mechanism, provided by the contour, centers the shaft 33 in the journal seats 31a and 31b. The described contour could alternately be indented into shaft bearing surfaces which would then face smooth journal surfaces as illustrated in FIGURE 4.

The number of gas pressure pockets and orificial pockets vary with the circumferential size of the individual bearings and the dynamic performance required of the bearing. The representative contoured surface illustrated in FIGURE 1 involves three gas pressure pockets and orificial pockets. In actual practice, the tri-pocket configuration is suitable only for bearings for intermediate size. For larger bearings, increasing the number of gas pressure pockets further enhances radial stiffness, increases the load-carrying ability, and increases the dynamic stability of the bearing.

In the bearing embodiments shown in FIGURES 3 and 4, either the journal or the shaft could be the moving member of the illustrated bearings. However, the most stable bearing configuration results when the described contoured surface is indented into the bearing surfaces of the stationary member.

For the machining arts, the described bearing shows sufficient radial stiffness and load-carrying ability. Actual stability of rotation to within one millionth of an inch has been achieved using an unfiltered pressurized gas source as the lubricant in the bearings. The prohibitive cost of gas consumption is avoided because of the increased stiffness properties at lower gas pressures. In particular, the described externally pressurized gas journal bearing is ideal for use in tooling machines and metrological applications where extreme accuracy is desired.

While the invention is described with respect to preferred embodiments, it will be apparent to those skilled in the art that numerous variations and modifications may be made within the spirit and scope of the invention. For example, the orificial pockets could communicate with the gas pressure pockets by means other than the circumferential channel indentations.

I claim:
1. An improved externally pressurized gas bearing including a cylindrical journal housing and a cylindrical shaft having concentrically facing bearing surfaces lubricated by an axially flowing gas, one of said bearing surfaces being smooth, said improvement comprising a surface contour of the second of said bearing surfaces having:
   (a) a plurality of axially narrow, circumferentially extending, deep orifice pocket indentations defined therein, uniformly spaced in a circumferential row therearound;
   (b) an equal number of axially wide, shallow pressure pocket indentations defined therein, uniformly spaced in a circumferential row therearound and axially spaced from said orifice pocket indentations in the direction of flow of said gas;
   (c) a first annular land defined between said circumferential row of orifice pocket indentations and a first peripheral edge of said contour, said first land in coaction with the smooth bearing surface defining an annular orifice for controlling gas flowing into circumferential sections of said bearing;
   (d) a second annular land defined between said circumferential row of pressure pocket indentations and a second peripheral edge of said contour at the opposite end thereof from said first peripheral edge, said second land in coaction with said smooth bearing surface defining an orifice for controlling gas flowing out of circumferential sections of said bearing;
   (e) a third annular land defined between said circumferential rows of orifice pocket and pressure pocket indentations having greater axial length than said first and second annular lands; and
   (f) channel indentations defined in said third land of said contour circumferentially traversing same and respectively connecting said orifice pocket indentations to diametrically opposite ones of said pressure pocket indentations.

2. The externally pressurized gas bearing of claim 1, further characterized in that said orifice pocket and pressure pocket indentations defined by said surface contour have equal circumferential widths.

3. The externally pressurized gas bearing of claim 2, wherein said surface contour is the bearing surface of said journal housing, and said smooth surface is the bearing surface of said cylindrical shaft.

4. The externally pressurized gas bearing of claim 2, wherein said surface contour is the bearing surface of said cylindrical shaft, and said smooth surface is the bearing surface of said journal housing.

References Cited

UNITED STATES PATENTS

| | | | |
|---|---|---|---|
| 2,449,297 | 9/1948 | Hotter | 308—122 |
| 2,459,825 | 1/1949 | Martellotti | 308—122 |

MARTIN P. SCHWADRON, Primary Examiner

F. SUSKO, Assistant Examiner